Oct. 30, 1962 E. TÖNNIES ET AL 3,060,685
MULTIPLE ENGINE JET-PROPULSION DRIVE
AND THRUST REVERSER FOR AIRCRAFT
Filed Sept. 16, 1960 5 Sheets-Sheet 1

EDUARD TÖNNIES
WILHELM FRICKE
INVENTORS

EDUARD TÖNNIES
WILHELM FRICKE
INVENTORS

EDUARD TÖNNIES
WILHELM FRICKE
INVENTORS

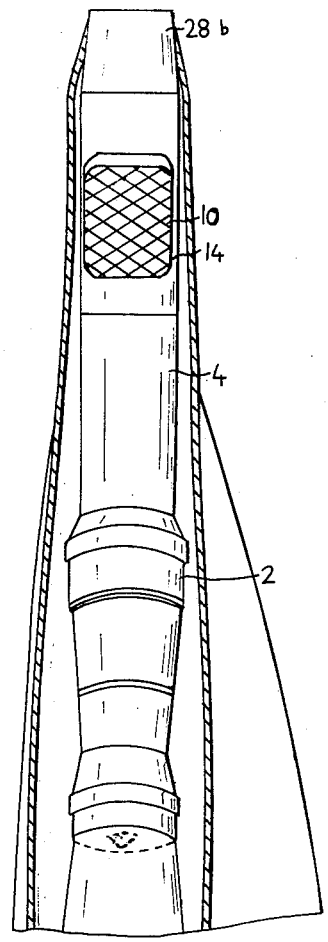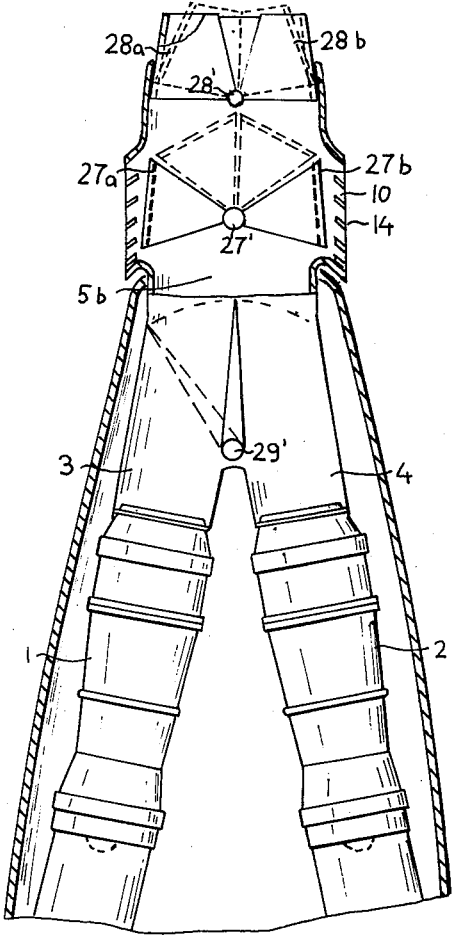
Fig. 12  Fig. 11
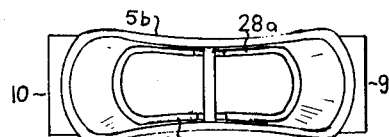
Fig. 13
EDUARD TÖNNIES
WILHELM FRICKE
INVENTORS Oct. 30, 1962 E. TÖNNIES ET AL 3,060,685
MULTIPLE ENGINE JET-PROPULSION DRIVE
AND THRUST REVERSER FOR AIRCRAFT
Filed Sept. 16, 1960 5 Sheets-Sheet 5
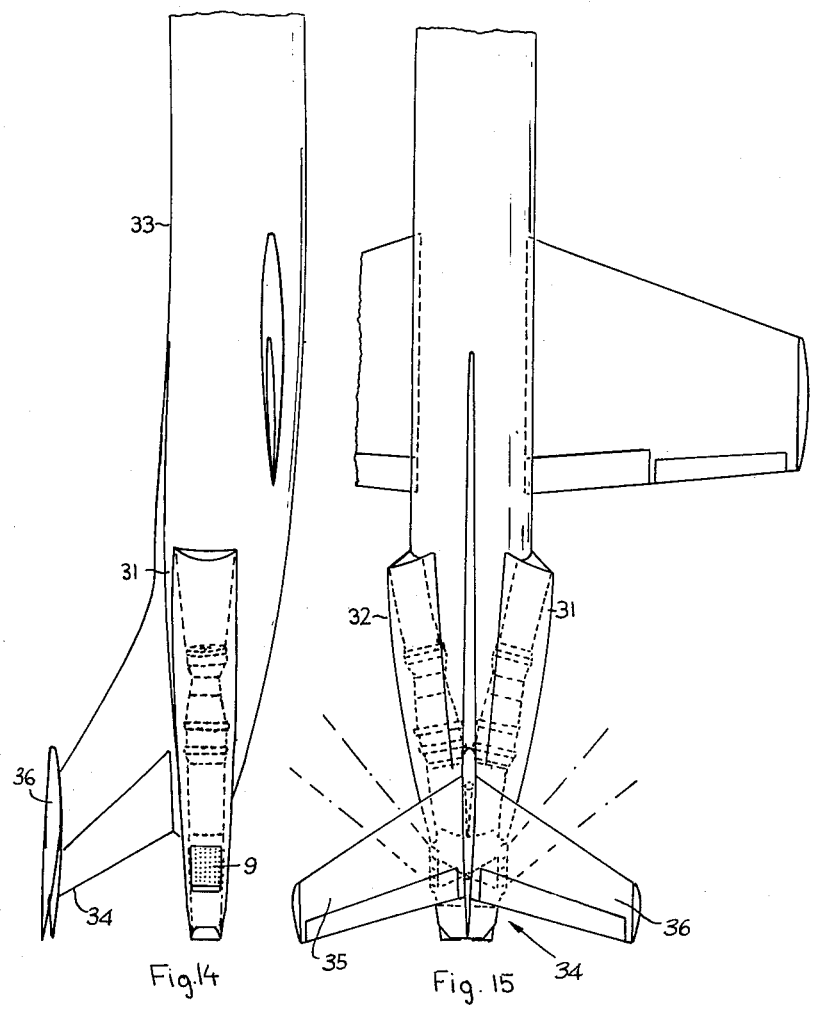
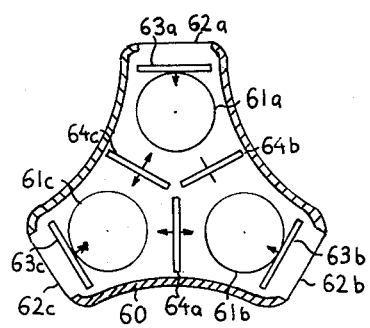
EDUARD TÖNNIES
WILHELM FRICKE
*INVENTORS*
BY *Mestern and Rollin*
*Attorneys*

United States Patent Office 3,060,685
Patented Oct. 30, 1962

3,060,685
MULTIPLE ENGINE JET-PROPULSION DRIVE AND THRUST REVERSER FOR AIRCRAFT
Eduard Tönnies, Hamburg-Rissen, and Wilhelm Fricke, Buchholz, Nordheide, Germany, assignors to Hamburger Flugzeugbau G.m.b.H., Hamburg-Finkenwerder, Germany
Filed Sept. 16, 1960, Ser. No. 56,559
Claims priority, application Germany Sept. 17, 1959
7 Claims. (Cl. 60—35.54)

The present invention relates to a jet-propulsion drive for aircraft and, more particularly, to a system wherein the thrust gases from the jet engines are discharged at the rear of the fuselage of the craft.

In modern high-speed aircraft it has been common practice to mount a plurality of jet engines on the fuselage itself rather than on the wings, either directly or with the aid of special nacelles. The use of nacelles increases the air resistance of the craft and also adds to its weight, whereas the direct mounting of the engine exhausts on the fuselage body has heretofore tended to complicate the reversal of thrust which is necessary as a speed-reducing means during landing on short runways. Since the reverse thrust in such cases will have to be guided at an acute angle to the forward direction of the craft rather than axially thereof, it has hitherto been the practice to deflect the gas stream of each thrust-reversed engine upwardly and/or downwardly but not laterally, in order to avoid a sharp veering of the craft if one of these engines should fail. This, however, has other drawbacks since the upwardly directed exhaust gases are liable to damage the tail assembly whereas a downward stream tends to whirl up dust and dirt which could be aspirated by the engines.

An important object of the present invention is to provide means for so controlling the reverse thrust of jet engines mounted directly on the fuselage body as to avoid the disadvantages referred to.

A more particular object of the invention is to provide means for laterally discharging the exhaust gases of a plurality of jet engines, operating with reverse thrust, in such manner as to prevent the development of asymmetrical forces in the event of failure of an engine.

A related object of this invention is to provide means for so controlling the lateral forward thrust on opposite sides of the fuselage as to produce a component designed to counteract transverse forces (e.g. cross winds) acting upon the craft from without.

It is also an object of the present invention to provide means for effectively re-orienting the normal, rearwardly directed stream of the thrust gases, upon failure of an engine, in such manner as to maintain the craft on its course.

Broadly speaking, the invention provides a system of conduits which form a plurality of ducts for the exhaust gases of the several jet engines and which also establish, at least during normal operation, a rear outlet for these gases, the ducts merging ahead of this outlet to a common conduit in which means are provided for selectively shutting off one or the other of the ducts in the event of failure of the respective engine. The residual gases, i.e. those delivered by the remaining engine or engines, will then distribute themselves substantially uniformly within the common conduit so that the resulting thrust, whether directed rearwardly through the outlet or forwardly via suitably inclined lateral passages, will remain practically centered with respect to the craft axis. In regard to the rearward thrust it is also possible, pursuant to a more specific feature of the invention, to adjust the effective width of the outlet in order to adapt it to the diminished gas pressure within the conduit.

The thrust reversal can be effected in a variety of ways, e.g. with the aid of hoods which normally channel the gases to the rear but can be swung around to deflect them in a generally forward direction. The common conduit may, however, also be in the form of a nozzle with lateral ports, the selective blocking of the ducts being then advantageously accomplished either by baffles normally serving as removable covers for these ports or by a swingable baffle which, when not so used, forms a partition between the ports so that, except in the event of engine failure, the gas stream from each engine will be deflected through a respective port when the thrust is reversed.

The above and other objects, features and advantages of the present invention will become more fully apparent from the following detailed description, reference being had to the accompanying drawing in which:

FIG. 11 is a view similar to FIG. 1 of still another embodiment;

FIG. 12 is a side-elevational view of the system of FIG. 11;

FIG. 13 is an end-elevational view of the system of FIGS. 11 and 12;

FIGS. 14 and 15 illustrate, in side-elevational view and partial top plan view, respectively, an aircraft equipped with a jet propulsion system according to the invention; and FIG. 16 is a cross-sectional view of a further modification.

Figure 1:
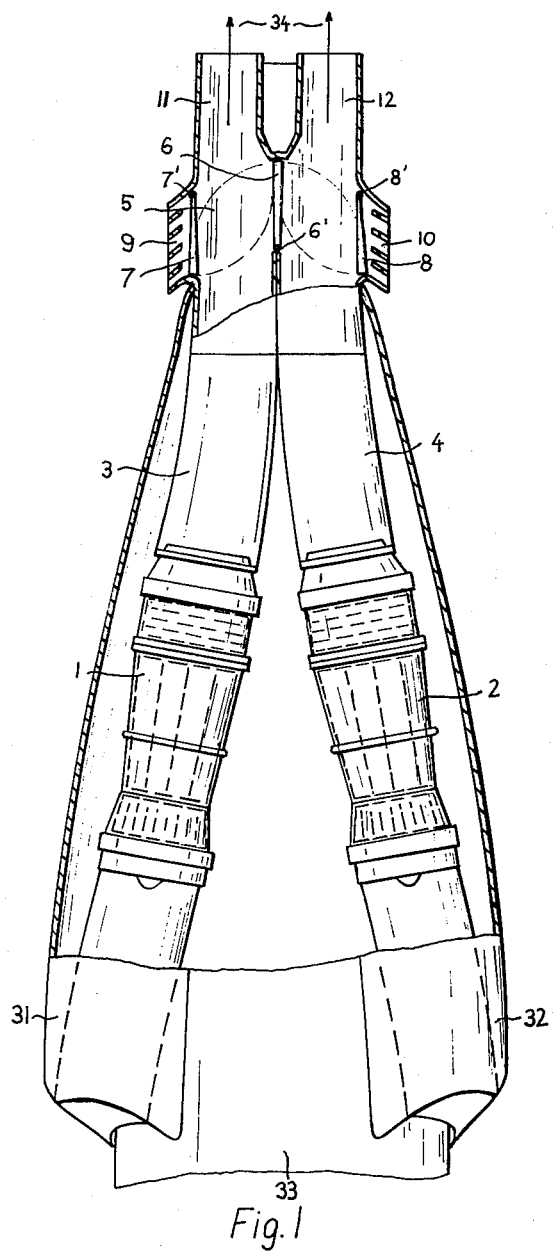
FIG. 1 is a plan view, partly in section, of the exhaust system for a pair of jet engines embodying the present invention.

Reference will first be made to the system shown in FIGS. 1–3. Mounted within sleeves 31, 32 at the rear part of the fuselage 33 of an aircraft (see also FIGS. 14 and 15) are a pair of converging tubes 1, 2 located on opposite sides of the vertical plane of symmetry of the craft. These tubes form ducts 3, 4 which merge into a nozzle 5 constituting a common conduit for the gases arriving through the ducts. Nozzle 5 is provided with a central baffle 6 which is swingable about a vertical pivot 6' and lies between two lateral ports 9 and 10; these ports are provided with swingable covers 7 and 8 whose respective pivots are shown at 7' and 8'. Two outlets 11 and 12 are formed at the rear of nozzle 5 and are aligned with the tubes 1 and 2, respectively. The ports 9 and 10 are further provided with guide fins 13 and 14 extending at an acute angle to the forward direction of the craft. These parts are positioned in the region of the tail assembly 34 of the craft, underneath the plane of the tail wings 35, 36 thereof.

In the normal operation of the aircraft, the parts are in the position illustrated in FIG. 1, with outlets 11 and 12 unblocked and with ports 9 and 10 closed by their respective covers 7 and 8; baffle 6 occupies a neutral position in the plane of symmetry of the fuselage. The thrust of the gases is directed rearwardly and is symmetrical with respect to that plane, as indicated by the arrows 34.

Figure 2:
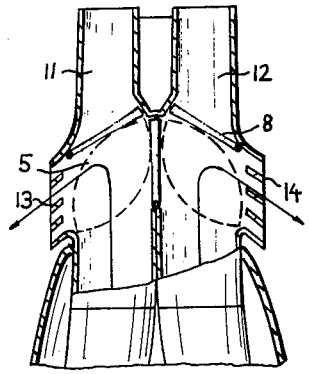
Figure 4:
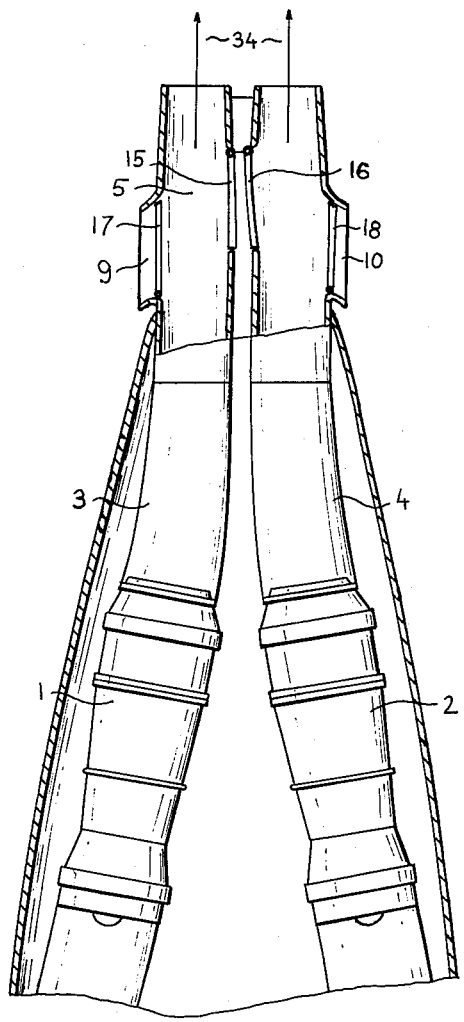
FIGS. 4, 5 and 6 are views respectively similar to FIGS. 1, 2 and 3 but illustrating a different embodiment.

When the thrust of the engines is to be reversed, the covers 7, 8 are swung around their pivots to close the outlets 11 and 12, as illustrated in FIG. 2, while deflecting the exhaust gases from tubes 1 and 2 outwardly via ports 9 and 10. The resulting jet streams, illustrated at 29 and 30 in FIG. 14, deliver an axially directed forward thrust to the craft.

Figure 3:
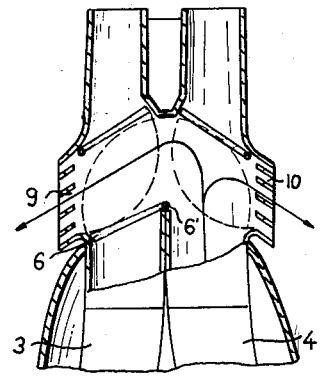
FIGS. 2 and 3 are views of the right-hand portion of FIG. 1 in different operating positions.

FIG. 3 illustrates the conditions existing in the event of failure of the right-hand engine during thrust reversal. Baffle 6 has been swung about its pivot 6' to block the duct 3 associated with the faulty engine, the residual gases from duct 4 being so distributed within the nozzle 5 by the joint action of deflectors 7, 8 and 6 as to merge again symmetrically from the ports 9 and 10 to form the jet streams 29 and 30.

Figure 6:
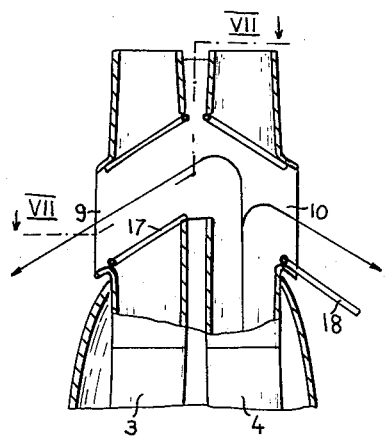
Figure 7:
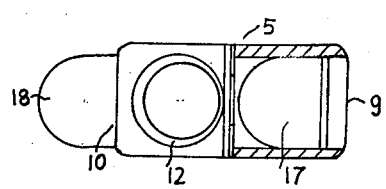
FIG. 7 is a view taken on the line VII—VII of FIG. 6.

The system of FIGS. 4–7 deviates from that shown in FIGS. 1–3 in that the single baffle 6 has been replaced by a pair of flaps 15, 16 which can be swung about their pivots 15' and 16', in the case of thrust reversal, to block the outlets 11 and 12; covers 7 and 8 have been replaced by flaps 17 and 18 which normally close the ports 9 and 10 (FIG. 4), but can be swung outwardly around their pivots 17', 18' (FIG. 5), concurrently with the closure of outlets 11 and 12 by flaps 15 and 16, to establish the lateral jet streams 29 and 30 (FIG. 15). Again, the ducts 3 and 4 can be selectively blocked in the event of engine failure, this being accomplished in the present embodiment with the aid of the corresponding flap 17 or 18 as illustrated in FIGS. 6 and 7.

Figure 8:
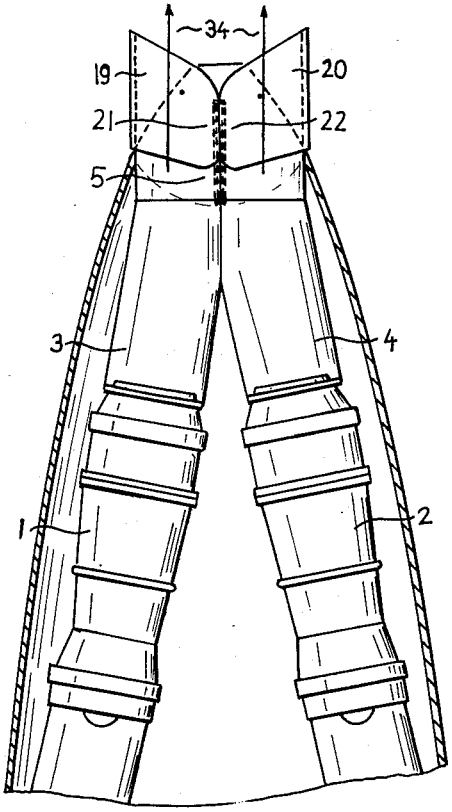
FIGS. 8, 9 and 10 are again views similar to FIGS. 1, 2 and 3, respectively, with reference to a further modification.
Figure 10:
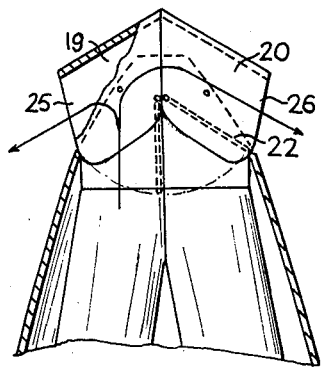
Figure 9:
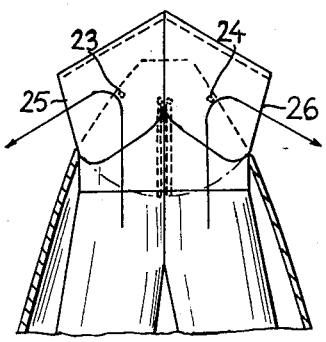

The embodiment of FIGS. 8–10 utilizes a common conduit 5a which is open rearwardly and laterally and whereon a pair of hoods 19, 20 are mounted for swinging movement about pivots 23 and 24. When in their normal position illustrated in FIG. 8, these hoods form continuations of the ducts 3 and 4 to direct the gas stream rearwardly, again as indicated by the arrows 34. When swung around, the hoods 19 and 20 close the rear outlets and form lateral openings at 25, 26 through which the forwardly deflected gases can escape in the general manner and for the purpose previously specified.

Flaps 21 and 22, similar to the members 15 and 16 of the preceding embodiment, can be selectively swung out of their normal position (FIGS. 8 and 9) to block one of the ducts 3, 4, as shown in FIG. 10 for the flap 22 in the event of engine failure. The result of this operation will be again a substantially uniform distribution of the residual gases within the chamber formed by conduit 5a and hoods 19, 20 so as to maintain the lateral thrusts in equilibrium.

The system of FIGS. 11–13 utilizes, within a conduit 5b, a pair of hoods 27a, 27b, generally similar to the hoods 19 and 20 of FIGS. 8–10, which are swingable about a pivot 27'. Conduit 5b terminates in an outlet which includes a pair of adjustable sleeves 28a, 28b having a pivot at 28'. A baffle 29 extends rearwardly from the junction of ducts 3 and 4, in a manner similar to baffle 6 of FIGS. 1–3, and is swingable about its pivot 29' for the purpose of selectively blocking either of these ducts as illustrated in dot-dash lines in FIG. 11.

The thrust-reversing position of hoods 27a, 27b has also been illustrated in dot-dash lines in FIG. 11. Similarly, there has been indicated in dot-dash lines an alternative position of sleeves 28a, 28b which effectively reduces the width of the outlet of conduit 5b. The sleeves are advantageously brought into this alternative position upon the closure of one of the ducts 3, 4 by baffle 29 in order to maintain this width commensurate with the reduced rate of gas flow through the conduit 5b. It will also be apparent that, under these circumstances, the hoods 27a, 27b may be shifted from their solid-line position in a manner more evenly directing the reduced gas flow toward the sleeves 28a and 28b.

Figure 5:
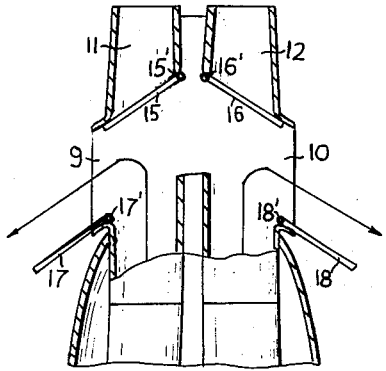

It will be understood that suitable mechanical, electrical or hydraulic connections, not shown, may be used to co-ordinate the movements of the stream-deflecting elements which are to be operated simultaneously, such as the flaps 15—18 in FIG. 5 or the baffle 29 and the sleeves 28a, 28b in FIG. 11.

The various deflector elements described and illustrated can also be used, in a manner which will be apparent to persons skilled in the art, for creating an unsymmetrical thrust in order to counteract cross winds and/or to help in the execution of turns, e.g. during take-off and landing. This can be accomplished, for example, by a partial rotation of baffle 6 or 29, by a suitable reorientation of the hoods 27a, 27b and/or by a partial obstruction of the rear and side outlets 9—12 by the associated flaps.

The invention can also be utilized with systems involving three or more engines. A three-engine system has been illustrated, by way of example, in FIG. 16 which is a sectional view taken approximately at the location of the section line VII—VII in the upper half of FIG. 6. This system comprises three symmetrically positioned ducts 61a, 61b, 61c located within a nozzle 60 having rear outlets (not shown) in alignment with these ducts. The nozzle 60 also has lateral ports 62a, 62b, 62c which are normally closed by respective covers 63a, 63b, 63c; these covers can also be swung around, in the manner described for the members 7 and 8 in FIGS. 1–3, to block the corresponding rear outlets. Baffles 64a, 64b, 64c normally form partitions between the ports 62a, 62b, 62c but can be pivoted to block any of the ducts 61a, 61b 61c in the event of engine failure. If the engine of duct 61a should flame out, for example, baffles 64b and 64c would be swung upwardly to block this duct while permitting free circulation of the gases from ducts 61b, 61c through the three ports 62a, 62b, 62c.

Although a specific type of aircraft has been illustrated in FIGS. 14 and 15, it will be apparent that the structure of the craft itself, the location of the exhaust system relative to the wings and the tail assembly, and details of the exhaust system itself may be modified in various ways without departing from the spirit and scope of the appended claims.

What is claimed is:

1. In a jet-propulsion drive mounted on the rear part of the fuselage of an aircraft, said aircraft having a tail assembly with tail wings in a substantially horizontal plane above said fuselage, in combination, conduit means forming a pair of rearwardly converging ducts for the exhaust gases of respective jet engines, said ducts extending generally longitudinally of the fuselage along opposite sides thereof, said conduit means normally forming a rearwardly open outlet for said gases underneath said tail wings in line with said ducts, said conduit means having at least two lateral openings communicating with the atmosphere in the region of said tail assembly below said horizontal plane, said openings being symmetrically relatively to the vertical plane of symmetry of said fuselage, deflector means at the rear of said conduit means selectively displaceable between a normal position and an off-normal position, said deflector means directing said gases from said ducts rearwardly through said outlet in said normal position, said deflector means blocking said outlet in said off-normal position while respectively directing said gases from said ducts over a pair of lateral thrust paths extending through said openings inclinedly forwardly at symmetrical locations with respect to the vertical plane of symmetry of said fuselage whereby the thrust of said gases is reversed, and shutter means in said conduit means selectively operable in said off-normal position for blocking one of said ducts while distributing the gases from the remaining duct substantially uniformly over said lateral paths.

2. The combination according to claim 1 wherein said deflector means comprises a pair of swingable hoods located on opposite sides of said plane of symmetry, said shutter means comprising at least one swingable baffle member normally extending within said plane of symmetry from the junction of said ducts toward said hoods.

3. The combination according to claim 1 wherein said conduit means includes a nozzle common to said ducts and provided with said outlet, said nozzle further having a pair of lateral ports defining said thrust paths, said shutter means being located within said nozzle.

4. The combination according to claim 3 wherein said shutter means comprises a swingable member extending rearwardly from the junction of said ducts, said member normally forming a partition between said ports.

5. The combination according to claim 4 wherein said nozzle is provided with a dividing wall in said outlet forming a continuation of said partition.

6. The combination according to claim 3 wherein said shutter means comprises a pair of cover members for said ports, each of said cover members being independently swingable between a port-closing position, a port-opening outside position and a duct-blocking inside position.

7. In a jet-propulsion drive mounted on the rear part of the fuselage of an aircraft, in combination, conduit means forming a pair of rearwardly converging ducts for the exhaust gases of respective jet engines, said ducts extending generally longitudinally of the fuselage along opposite sides thereof, said conduit means normally forming a rearwardly open outlet for said gases in line with said ducts, said conduit means having at least two lateral openings communicating with the atmosphere and located symmetrically relatively with respect to the vertical plane of symmetry of said fuselage, deflector means at the rear of said conduit means selectively displaceable between a normal position and an off-normal position, said deflector means directing said gases from said ducts rearwardly through said outlet in said normal position, said deflector means blocking said outlet in said off-normal position while respectively directing said gases from said ducts over a pair of lateral thrust paths extending through said openings inclinedly forwardly at symmetrical locations with respect to the vertical plane of symmetry of said fuselage whereby the thrust of said gases is reversed, and shutter means in said conduit means selectively operable in said off-normal position for blocking one of said ducts while distributing the gases from the remaining duct substantially uniformly over said lateral paths, said conduit means including a nozzle common to said ducts and provided with said outlet, said nozzle further having a pair of lateral ports defining said thrust paths, said shutter means comprising a swingable member located within said nozzle and extending rearwardly from the junction of said ducts, said member normally forming a partition between said ports, said nozzle being further provided with a dividing wall in said outlet forming a continuation of said partition.

References Cited in the file of this patent

UNITED STATES PATENTS

| | | |
|---|---|---|
| 2,587,649 | Pope | Mar. 4, 1952 |
| 2,638,740 | Sammons | May 19, 1953 |
| 2,849,861 | Gardiner et al. | Sept. 2, 1958 |
| 2,960,821 | Scherl | Nov. 22, 1960 |
| 2,973,921 | Price | Mar. 7, 1961 |